May 21, 1929.    A. M. BAILEY    1,714,414
WEANING DEVICE
Filed Oct. 1, 1928
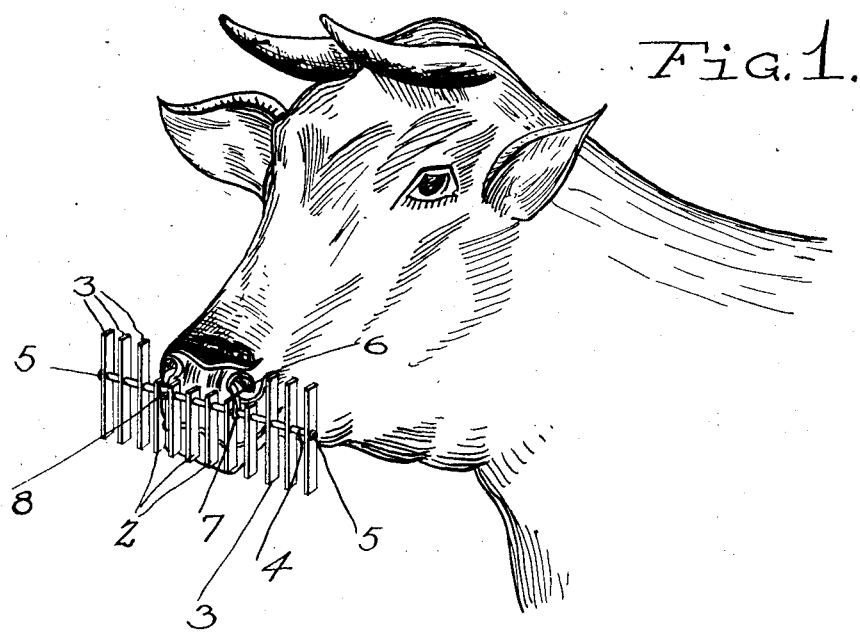
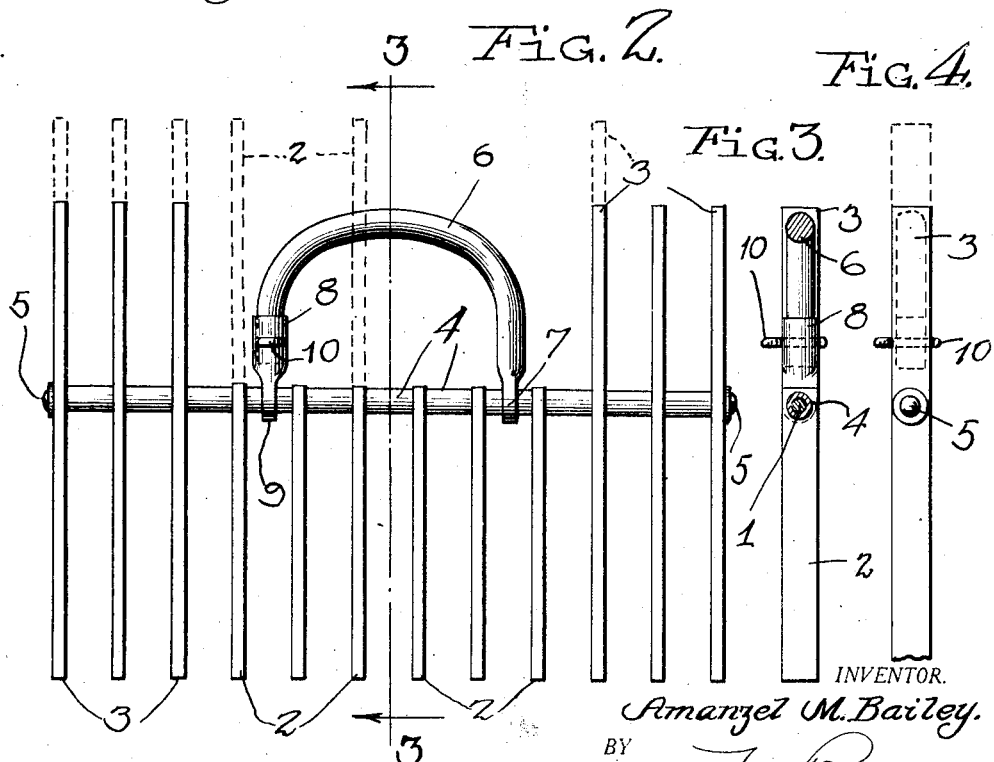

Patented May 21, 1929.

1,714,414

UNITED STATES PATENT OFFICE.

AMANZEL M. BAILEY, OF REWEY, WISCONSIN.

WEANING DEVICE.

Application filed October 1, 1928. Serial No. 309,467.

This invention relates to certain new and useful improvements in weaning devices and has for its primary object to provide a weaning device designed to be detachably connected to the nose of a cow and comprising a plurality of pivotally supported fingers or bars extending across the mouth of the cow and laterally thereof in a manner to prevent a cow from sucking or drawing milk from another cow and from itself.

A further object of the invention is to provide a weaning device for cows that is detachably connected to the nose of a cow and associated with the mouth in a manner to prevent the cow wearing the same attacking itself or other cows in attempting to draw milk from a teat.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a schematic view showing a cow weaner in perspective attached to the nose of a cow;

Figure 2 is a front elevational view of a cow weaner showing the pivotally supported bars normally depending from a rod and further illustrated by dotted lines in reversed position;

Figure 3 is a vertical cross-sectional view taken on line 3—3 of Figure 2; and

Figure 4 is an end elevational view of the same.

The invention relates to a weaner adapted to be worn by cows to prevent a cow from sucking or drawing milk from itself and from other cows and is designed for detachable connection with the nose of the cow to extend across the cow's mouth and laterally thereof so that a cow equipped with the weaner cannot take a teat into its mouth. The weaner comprises a rod 1 having a plurality of bars pivotally mounted thereon, the intermediate bars 2 being pivotally supported at their upper ends on the rod 1 while the end bars 3 are pivotally supported on the rod 1 intermediate their ends at points above the median lines thereof to insure vertical suspension. Each of the guard bars 2 and 3 is separated by a spacing collar 4, while all of said bars are retained on the rod by end retainers 5 of suitable construction.

A nose link 6 of U-formation as shown in Figure 2, has one end 7 thereof apertured for the free passage of the rod 1, the aperture being of a size relative to said rod to permit limited pivotal movement of the nose link thereon. The other end of the nose link 6 is received in the socketed keeper 8 that is pivotally mounted as at 9 upon the rod 1, the free end of the nose link 6 and the wall of the socketed keeper 8 having transverse openings therein adapted to register when assembled for the passage of the cotter key 10 or other retaining means.

The weaning device is attached to the cow's nose by the link 6 and the intermediate short bars 2 depending from the rod 1 overhang the mouth of the cow as illustrated in Figure 1, while the relatively longer end bars 3 extend above and below the mouth and laterally thereof. The end bars 3 being pivotally mounted on the rod 1 above their median lines always assume vertical positions while the intermediate bars 2 when swung upwardly by the cow abut the nose and are immediately thrown downwardly to overlie the mouth of the cow. A weaner of this character can be worn by a cow with little inconvenience but will be entirely effective in preventing the cow from sucking or drawing milk from other cows or from itself. The intermediate bars 2 prevent a direct attack while the laterally positioned relatively longer bars 3 prevent the cow from taking a teat into the side of the mouth.

The rod may be looped at its ends if desired and also shaped by curving to closely fit the sides of the nose and mouth.

From the above detailed description of the invention, it is believed that the construction and operation thereof will at once be apparent, and while there is herein shown and described the preferred embodiment of the present invention, it is nevertheless to be understood that minor changes may be made therein without departing from the spirit and scope of the invention as claimed.

What I claim as new is:—

1. A cow-weaner comprising a rod, a plurality of bars pivotally suspended thereon and a nose link of U-shape pivotally attached at its ends to the rod intermediate the ends thereof, the end bars being pivotally mounted on the rod intermediate their ends to extend above and below the rod laterally of the cow's mouth.

2. A cow weaner comprising a rod, a plurality of bars pivotally suspended thereon, a nose link of U-shape pivotally attached at its ends to the rod intermediate the ends thereof, said nose link having one end loosely engaged with the rod, and the other end comprising a socketed fitting on the rod, and a detachable connection with the link, the end bars being pivotally mounted on the rod intermediate their ends to extend above and below the rod laterally of the cow's mouth.

3. A cow weaner comprising a rod, a plurality of bars pivotally suspended thereon and a nose link of U-shape pivotally attached at its ends to the rod intermediate the ends thereof, the intermediate bars being pivotally supported at their upper ends on the rod to depend and overlie the mouth, and the end bars being pivotally mounted on the rod intermediate their ends to extend above and below the rod laterally of the cow's mouth.

4. A cow weaner comprising a rod, a plurality of bars pivotally suspended thereon, a nose link of U-shape pivotally attached at its ends to the rod intermediate the ends thereof, said nose link having one end loosely engaged with the rod and the other end comprising a socketed fitting on the rod, a detachable connection with the link, the intermediate bars being pivotally supported at their upper ends on the rod to depend and overlie the mouth, and the end bars being pivotally mounted on the rod intermediate their ends to extend above and below the rod laterally of the cow's mouth.

In testimony whereof I affix my signature.

AMANZEL M. BAILEY.